No. 888,731. PATENTED MAY 26, 1908.
J. T. H. PAUL.
FILTER.
APPLICATION FILED JAN. 16, 1908.
2 SHEETS—SHEET 2.
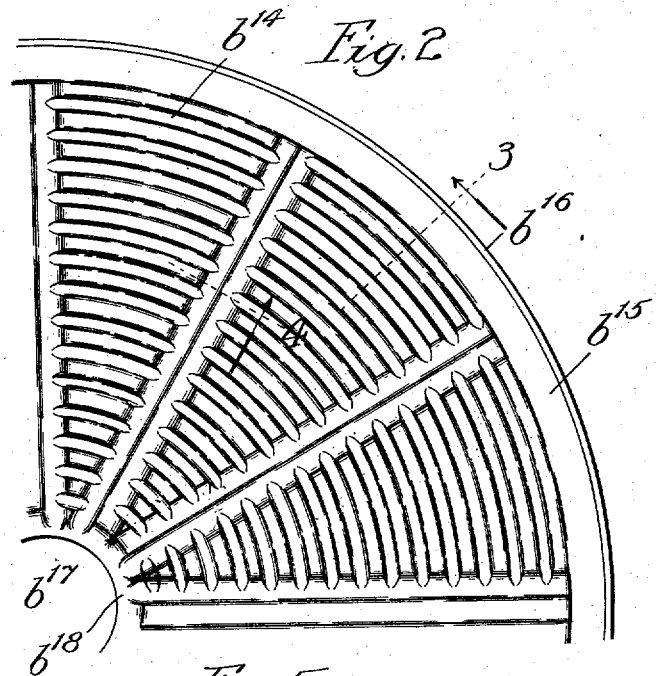
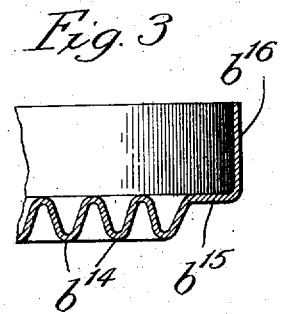
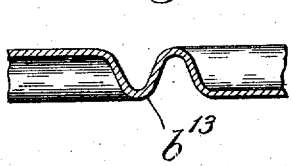
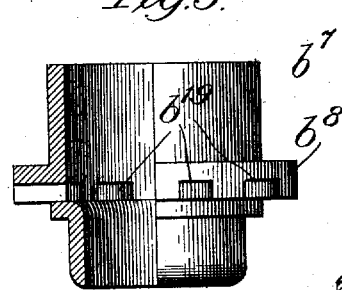
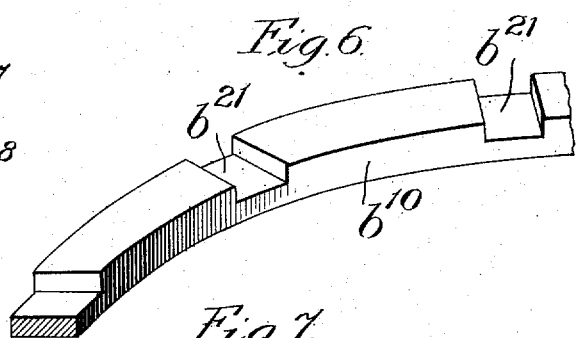
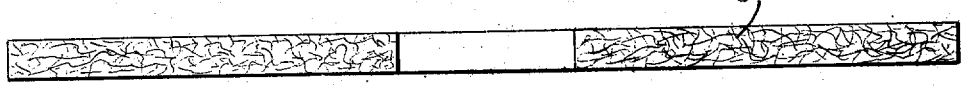
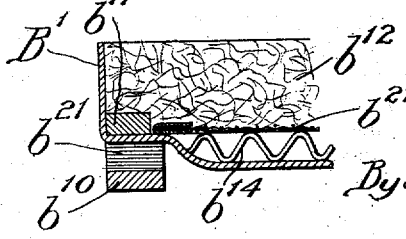
Witnesses:
Inventor:
John T. H. Paul.
By Dyrenforth, Lee, Chritton & Wiles
Attys.

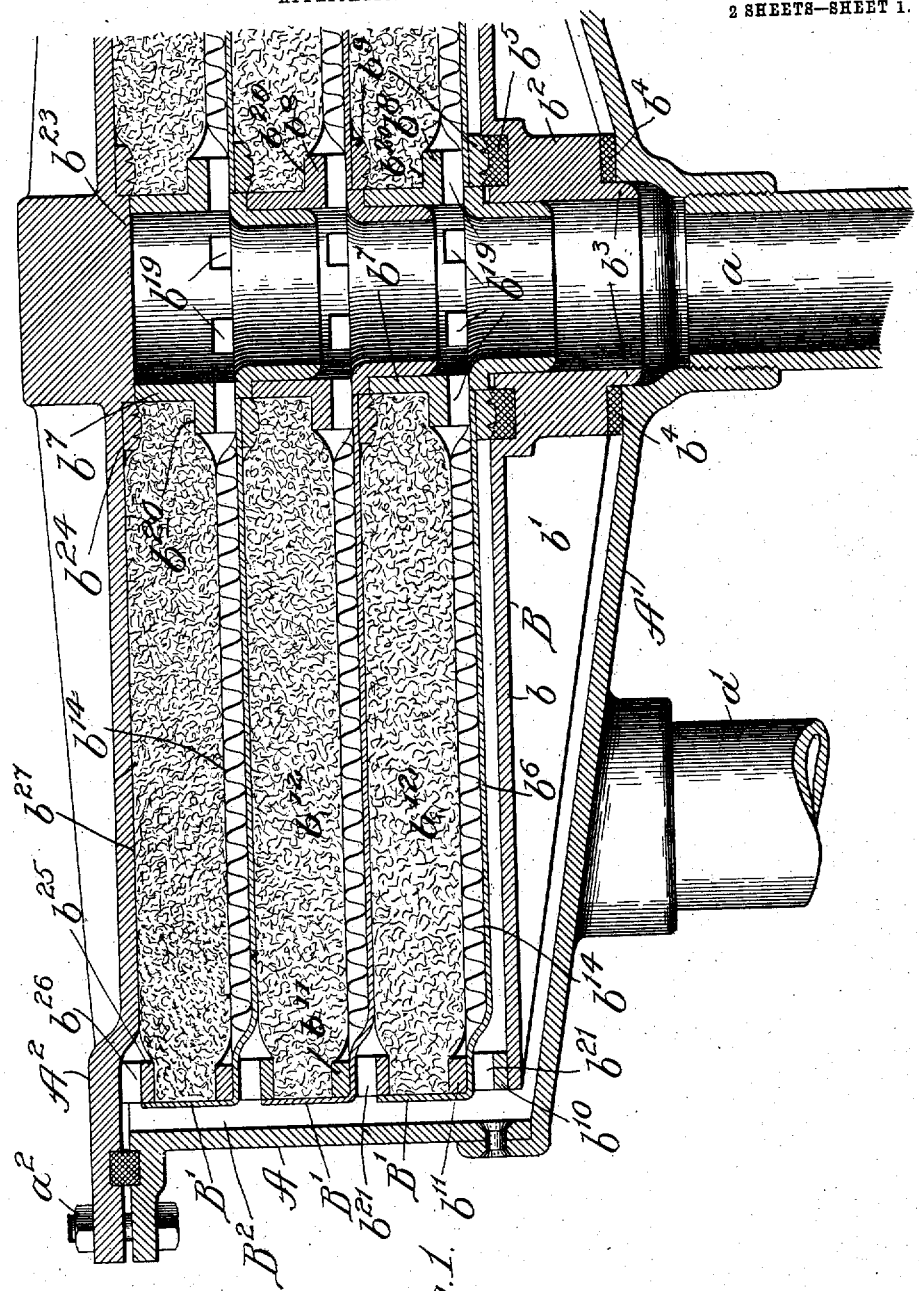

UNITED STATES PATENT OFFICE.

JOHN T. H. PAUL, OF CHICAGO, ILLINOIS, ASSIGNOR TO E. GOLDMAN & COMPANY, INCORPORATED, OF CHICAGO, ILLINOIS, A CORPORATION OF ILLINOIS.

FILTER.

No. 888,731.   Specification of Letters Patent.   Patented May 26, 1908.

Application filed January 16, 1908.   Serial No. 411,158.

*To all whom it may concern:*

Be it known that I, JOHN T. H. PAUL, a citizen of the United States, residing at Chicago, in the county of Cook and State of Illinois, have invented a new and useful Improvement in Filters, of which the following is a specification.

My invention relates particularly to filters for use in filtering liquors, such as beer; and my primary object is to provide a filter composed of a plurality of cells, each cell having few parts, and the filter being of high capacity, well adapted to perform with thoroughness the function of filtration, and the filter-parts being capable of ready cleansing and, the construction being, therefore, sanitary in its nature.

The invention is illustrated in its preferred embodiment in the accompanying drawings, in which—

Figure 1 represents a broken vertical sectional view of a filter constructed in accordance with my invention; Fig. 2, a broken plan view of a filter pan employed; Fig. 3, a broken sectional view taken as indicated at line 3 of Fig. 2; Fig. 4, a broken sectional view taken as indicated at line 4 of Fig. 2; Fig. 5, a view partly in section and partly in elevation of a conduit-section employed; Fig. 6, a broken perspective view of a packing-ring employed; Fig. 7, a sectional view of a pad or disk of filter material and which preferably is preparatorily formed before insertion in the filter; and Fig. 8, a broken sectional view illustrating a slight modification.

In the construction illustrated, A represents a casing having a dished bottom $A^1$ and a removable top $A^2$; B, an inner base-plate supported on the casing bottom $A^1$; and $B^1$, a series of filter cells located in the casing and forming with the cylindrical wall of the casing an annular chamber $B^2$.

The casing A may be of any approved construction. In the construction shown, the casing bottom $A^1$ is equipped centrally with an outlet conduit $a$ and at some distance with an inlet conduit $a^1$. The casing top $A^2$ is shown connected with an external flange at the upper end of the cylindrical body of the casing by bolts $a^2$.

The inner base-plate B comprises a disk $b$ equipped on its lower side with strengthening ribs $b^1$ and provided at its center with a hollow hub or conduit-section $b^2$. The conduit-section $b^2$ has a reduced portion $b^3$ at its lower end which fits within the hollow boss of the casing bottom $A^1$, and confined between the body of the conduit-section $b^2$ and the adjacent portion of the casing bottom $A^1$ is a gasket or packing $b^4$. The conduit-section $b^2$ is provided at its upper end with an annular groove receiving a gasket or packing $b^5$.

Each cell $B^1$ comprises a cell-pan $b^6$ whose bottom is provided with a central perforation; a conduit-section $b^7$ extending through said central perforation and provided externally with a flange $b^8$ which rests upon the upper surface of the bottom of the pan; a packing-ring $b^9$ encircling the conduit-section and between which and the flange $b^8$ the central portion of the pan-bottom is confined; a packing-ring $b^{10}$ connected with the lower outer margin of the pan-bottom; a packing-ring $b^{11}$ resting upon the upper outer marginal surface of the pan-bottom; and a filter mass, or disk of filtering material $b^{12}$ which substantially fills the pan. The pan-bottom is provided at intervals with radial corrugations $b^{13}$ joined by part circular corrugations $b^{14}$, as clearly appears from Figs. 2, 3 and 4. The pan-bottom also has a flat marginal portion $b^{15}$ adjacent to the vertical flange $b^{16}$ which constitutes the circumferential wall of the pan. The flat marginal portion $b^{15}$ of the bottom is substantially in the plane of the upper portions of the corrugations, or, in other words, is raised with relation to the extreme bottom portion of the pan. The pan bottom has a central perforation $b^{17}$ and a marginal flat portion $b^{18}$ adjacent thereto. The flat inner marginal portion $b^{18}$ is substantially on a level with the lower portions of the corrugations of the pan-bottom, or, in other words, is depressed beneath the plane of the outer flat marginal portion $b^{15}$ of the pan-bottom. The pan-bottom being corrugated, as described, has grooves on its upper surface which serve in collecting the filtered liquor and conducting it to the central outlet conduit, and has channels or grooves on its lower surface which serve in distributing the unfiltered liquor over the upper surface of the filtering material, or filter pad. As stated, the flange $b^8$ of the conduit-section $b^7$ bears upon the upper surface of the inner marginal flat portion $b^{18}$ of the pan-bottom, and extending through the conduit-section are radial openings $b^{19}$ which register with the radial grooves which the corrugations $b^{13}$ afford on the upper surface of the pan-bottom. The upper surface of the flange $b^8$ affords a shoulder $b^{20}$, the flange acting as a packing-ring co-acting with the packing-ring $b^9$ of the filter cell above. The lower end of the lowermost conduit section $b^7$ fits within the upper end of the conduit-section $b^2$, and the upper end of the lowermost conduit-section $b^7$ receives the lower end of the next surmounting conduit-section, and so on. The packing-rings $b^{10}$ are provided at their upper portions with radial perforations $b^{21}$ which register with the radial grooves on the lower side of the cell pan bottoms. The packing-rings $b^{10}$ on the lower side of the outer margin of each cell pan is of the right diameter to fit within the upper portion of the vertical flange of the cell pan beneath, as shown. The disks of filtering material $b^{12}$ are preferably preparatorily formed in a suitable press. When the filter parts are assembled, the pads or disks $b^{12}$ are again placed under compression, the packing rings at the outer and inner margins serving to prevent seepage of the liquor along the vertical flanges of the cell pans, so that the liquor will be forced to filter through the filter pads. The corrugations in the bottoms of the cell pans are deep and relatively narrow, so that it is practicable to allow the pads of filtering material to rest directly upon the corrugations, thereby dispensing with the fiber-retaining screens which are common in filter construction.

If desired, the fiber-retaining screen $b^{22}$ may be placed upon the corrugated bottom of the cell pan beneath the filter-pad $b^{12}$. Where a pad of good quality and long fiber is employed, the fiber-retaining screen $b^{22}$ is unnecessary, however.

The casing top $A^2$ is equipped centrally on its lower surface with a boss or bearing $b^{23}$ adapted to bear upon the upper end of the uppermost conduit-section $b^7$, and the boss $b^{23}$ is surrounded by a packing-ring $b^{24}$ which co-acts with the shoulder $b^{20}$ of the uppermost conduit-section. The casing top is also equipped near its periphery on its lower side with a packing-ring $b^{25}$ which is received in the upper portion of the uppermost cell pan. The packing-ring $b^{25}$ is provided with radial perforations $b^{26}$ and the lower side of the casing top is provided with grooves $b^{27}$, enabling the liquor to be distributed over the upper surface of the filter-pad in the uppermost cell.

The manner of assembling the parts of the filter will be readily understood. As stated, the pads or disks $b^{12}$ are preferably preparatorily formed before insertion in the filter, but are subjected to pressure after insertion in the filter when the bolts $a^2$ are tightened. In operation, the liquor enters through the conduit $a^1$ and passes to all parts of the annular chamber $B^2$, from whence it passes through the admission ports $b^{21}$ of the several cells, being distributed over the upper surface of the filter pads, whence it passes through the filter pads to the channels in the bottoms of the cell pans, from whence the liquor escapes through the openings $b^{19}$ of the central conduit-sections.

The foregoing detailed description has been given for clearness of understanding only, and no undue limitation is to be understood therefrom.

What I regard as new, and desire to secure by Letters Patent, is—

1. In a filter, the combination of a plurality of cells, each cell comprising a cell pan or support having its bottom provided on both sides with grooves, and provided centrally with a perforation, a conduit-section extending through said perforation, a packing-ring at the lower outer marginal surface of each cell pan bottom, the packing-ring of one cell pan being received in the upper portion of the cell pan beneath, and each packing-ring being provided with perforations, ports opening through said conduit-sections and communicating with the grooves on the upper sides of the cell pan bottoms, and filter-masses in said cell pans.

2. In a filter, the combination of a plurality of cells, each cell comprising a cell pan having a corrugated bottom affording grooves on both sides of the bottom, the bottom having a central perforation, a conduit-section extending through said perforation and equipped with an external flange serving as a packing-ring located above the upper marginal surface surrounding said perforation, said conduit-section having perforations and communicating with the grooves on the upper surface of the cell pan bottom, a packing-ring surrounding the conduit-section beneath the cell pan bottom, a packing-ring at the lower outer marginal surface of the cell pan bottom provided with perforations communicating with the grooves on the under surface of the cell pan bottom, the last-named packing-ring of each cell pan bottom being received in the upper portion of the cell pan beneath, and a filter-mass confined between the bottom of each cell pan and the lower surface of the bottom of the next superposed cell pan.

3. In a filter, the combination of a plurality of cells, each cell comprising a cell pan having a corrugated bottom provided with a central perforation and having a raised flat outer marginal portion and a depressed flat inner marginal portion, a conduit-section having an external flange bearing upon the upper surface of the inner marginal portion of the cell pan bottom, said conduit-section having perforations communicating with the grooves on the upper surface of the cell pan bottom, the lower portion of the conduit-section being of a reduced diameter, a packing-ring on the conduit-section beneath the lower surface of the inner margin of the cell pan bottom, a packing-ring applied at the lower surface of the outer marginal portions of the cell pan bottom and provided with perforations, said last-named packing-ring of one cell pan bottom being received within the upper portion of the cell pan beneath, and a filter-mass in the cell pan confined between the cell pan bottom and the lower surface of the bottom of the next superposed cell pan.

4. In a filter, the combination of a plurality of filter-cells, each cell comprising a cell pan or support having a corrugated bottom and a central perforation, and having a raised flat outer marginal portion and a depressed flat inner marginal portion, a conduit-section extending through said central perforation and having an external flange bearing upon the upper surface of the inner marginal portion of the cell pan bottom, and perforations extending therethrough and communicating with the grooves on the upper surface of the cell pan bottom, a packing-ring encircling the conduit-section and bearing against the lower surface of the inner marginal portion of the cell pan bottom, a packing-ring bearing upon the upper surface of the outer marginal portion of the cell pan bottom, a packing-ring applied at the lower surface of the outer marginal portion of the cell pan bottom and provided with perforations communicating with the grooves on the lower side of the cell pan, and filter-masses in said cell pan.

5. In a filter, the combination of a plurality of cells, each cell comprising a cell pan or support having a bottom provided with deep and narrow corrugations and provided centrally with a perforation, a conduit-section extending through said central perforation, packing-rings above and beneath the cell pan bottom at said conduit-section, packing-rings above and beneath the cell pan bottom at the outer marginal portion thereof, and a disk of filtering material in or on each cell pan or support and resting directly upon the corrugated bottom thereof.

6. In a filter, the combination of a casing having a central outlet conduit, an inlet conduit, and a plurality of cells within said casing and forming with the cylindrical wall of the casing an annular chamber, each cell comprising a cell pan having a corrugated bottom and a central perforation, a conduit-section extending through said central perforation and having an external flange forming a packing-ring at one side of the cell pan bottom, a packing-ring applied to the conduit-section at the opposite side of said cell pan bottom, said conduit-section having perforations and communicating with the grooves on the under surface of the cell pan bottom, a packing-ring applied to the upper surface of the outer marginal portion of the cell pan bottom, a packing-ring applied to the lower surface of the outer marginal portion of the cell pan bottom, said last named packing ring having perforations communicating with the grooves on the lower side of the cell pan bottom, the last-named packing-ring of one cell pan bottom being received within the upper portion of the cell pan beneath, and a single pad of filtering material confined in each cell pan.

7. In a filter-cell, the combination of a cell pan or support having a corrugated bottom and provided with a central perforation, the bottom of said cell pan having an elevated flat marginal portion adjacent to the vertical flange of the cell pan and having a depressed flat marginal portion surrounding the central perforation, a packing-ring applied to the lower surface of the cell pan bottom at the outer flat marginal portion thereof and provided with radial openings, an externally flanged conduit-section extending through said central perforation, the flange bearing upon the upper surface of the inner flat marginal portion of the cell pan bottom, the conduit-section having radial perforations communicating with the grooves on the upper surface of the cell pan bottom, and a packing-ring applied to the conduit-section at the lower surface of the inner flat marginal portion of the cell pan bottom.

8. In a filter-cell, a cell pan having a corrugated bottom and a central perforation, a packing-ring applied to the lower surface of the outer marginal portion of the cell pan bottom and having openings therethrough communicating with the grooves on the lower surface of the cell pan bottom, and a conduit-section extending through said central perforation and provided with perforations communicating with the grooves on the upper surface of the cell pan bottom.

9. In a filter cell, a cell pan or support having a bottom provided with corrugations and with a central perforation and provided with a flat raised outer marginal portion and a flat depressed inner marginal portion, a packing-ring applied to the lower surface of said outer flat marginal portion of the cell pan bottom and provided with openings extending therethrough, a conduit-section extending through said central perforation and having an externally flanged bearing upon the upper surface of the inner marginal portion of the cell pan bottom, said conduit-section having perforations therethrough communicating with the grooves on the upper surface of the cell pan bottom, and a packing-ring encircling said conduit-section and bearing against the lower surface of the inner marginal portion of the cell pan bottom.

JOHN T. H. PAUL.

In presence of—
  L. HEISLAR,
  R. SCHAEFER.